US005705571A

United States Patent [19]
Tsiang et al.

[11] Patent Number: 5,705,571
[45] Date of Patent: Jan. 6, 1998

[54] PROCESS FOR SELECTIVE HYDROGENATION OF CONJUGATED DIENE POLYMER

[75] Inventors: Raymond Chien-Chao Tsiang, Ming-Hsiung Hsiang; Henry Chi-Chen Hsieh, Ta-She Hsiang; Wen-Shien Yang, Tung-Kang Chen, all of Taiwan

[73] Assignee: Taiwan Synthetic Rubber Corporation, Taipei, Taiwan

[21] Appl. No.: 670,126

[22] Filed: Jun. 25, 1996

[30] Foreign Application Priority Data

May 17, 1996 [TW] Taiwan ................... 85105863

[51] Int. Cl.$^6$ ........................................ C08F 8/04
[52] U.S. Cl. ............... 525/338; 525/332.8; 525/332.4; 525/333.1; 525/333.2; 525/339
[58] Field of Search ................... 525/338, 339

[56] References Cited

U.S. PATENT DOCUMENTS

| | | | |
|---|---|---|---|
| 3,135,716 | 6/1964 | Uraneck et al. | |
| 3,150,209 | 9/1964 | Short et al. | |
| 3,231,635 | 1/1966 | Holden et al. | |
| 3,265,765 | 8/1966 | Holden et al. | |
| 3,322,856 | 5/1967 | Holden et al. | |
| 3,432,481 | 3/1969 | Webber | 260/82 |
| 3,496,154 | 2/1970 | Wofford | 260/84.7 |
| 3,498,960 | 3/1970 | Wofford | 260/84.7 |
| 3,595,942 | 7/1971 | Wald et al. | 260/880 |
| 3,634,549 | 1/1972 | Shaw et al. | 260/880 B |
| 3,670,054 | 6/1972 | De La Mare et al. | 260/880 B |
| 3,673,281 | 6/1972 | Bronstert et al. | 260/880 B |
| 3,696,088 | 10/1972 | De Vault | 260/85.1 |
| 3,700,633 | 10/1972 | Wald et la. | 260/880 |
| 3,792,127 | 2/1974 | Gillies | 260/880 |
| 3,823,203 | 7/1974 | De La Mare | 260/876 |
| 3,855,185 | 12/1974 | Loveless et al. | 260/80.78 |
| 4,077,893 | 3/1978 | Klovsky | 252/56 |
| 4,078,011 | 3/1978 | Glockner et al. | 260/677 |
| 4,125,569 | 11/1978 | Jackson | 260/683.9 |
| 4,141,847 | 2/1979 | Klovsky | 252/51.5 |
| 4,145,298 | 3/1979 | Trepka | 252/51.5 |
| 4,152,351 | 5/1979 | Drake | 260/465.8 |
| 4,152,365 | 5/1979 | Drehman | 585/256 |
| 4,238,202 | 12/1980 | Trepka et al. | 44/62 |
| 4,391,949 | 7/1983 | St. Clair | 525/99 |
| 4,444,953 | 4/1984 | St. Clair | 525/98 |
| 4,501,857 | 2/1985 | Kishimoto et al. | 525/338 |
| 4,560,817 | 12/1985 | Bobsein et al. | 585/273 |
| 4,629,767 | 12/1986 | Shyr et al. | 525/339 |
| 4,673,714 | 6/1987 | Kishimoto et al. | 525/314 |
| 4,801,666 | 1/1989 | Marks et al. | 526/123 |
| 4,929,699 | 5/1990 | Wilson et al. | 525/339 |
| 5,039,755 | 8/1991 | Chamberlain et al. | 525/338 |
| 5,132,372 | 7/1992 | Chamberlain et al. | 525/338 |
| 5,173,537 | 12/1992 | Chamberlain et al. | 525/105 |

*Primary Examiner*—Bernard Lipman
*Attorney, Agent, or Firm*—Fish & Richardson P.C.

[57] ABSTRACT

The present invention provides a process for selective hydrogenation of a conjugated diene polymer. The process includes bringing the conjugated diene polymer in an inert organic solvent into contact with hydrogen in the presence of a specific hydrogenation catalyst combination including (A) a substituted or unsubstituted bis(cyclopentadienyl) Group VIII transition metal compound and (B) an organic lithium compound. The hydrogenation can be carried out in the presence of a small amount of the hydrogenation catalyst combination under mild conditions, and both the hydrogenation conversion and selectivity to conjugated diene units are high.

42 Claims, No Drawings

5,705,571

PROCESS FOR SELECTIVE HYDROGENATION OF CONJUGATED DIENE POLYMER

BACKGROUND OF THE INVENTION

1. Field of the Invention

The present invention relates to a process for selective hydrogenation of a conjugated diene polymer, more particularly to a process for selective hydrogenation of a conjugated diene polymer utilizing a hydrogenation catalyst combination including a specific substituted or unsubstituted bis (cyclopentadienyl) Group VIII transition metal compound and an organic lithium compound.

2. Description of the Prior Art

Generally, polymers obtained by polymerizing or copolymerizing conjugated dienes are widely utilized for commercial purposes. These polymers have residual unsaturated double bonds in their polymer chains. These unsaturated double bonds are advantageously utilized for vulcanization and yet have a disadvantage in that they lack the stability to resist weather conditions, oxidation and ozone. Particularly, block copolymers obtained from conjugated dienes and vinyl aromatic hydrocarbons are used in their unvulcanized state as thermoplastic elastomers and transparent impact-resistant resins or as modifiers for styrenic resins and olefinic resins. Owing to the unsaturated double bonds present in their polymer chains, however, such block copolymers are deficient in resistance to weather conditions, oxidation, and ozone. In the field of exterior materials to which such properties are indispensable, therefore, the block copolymer find limited utility because of this drawback.

This deficiency in stability can be notably improved by hydrogenating such conjugated diene polymers and consequently eliminating the unsaturated double bonds persisting in the polymer chain thereof. Numerous methods have been so far proposed for hydrogenating conjugated diene polymers in the presence of suitable and effective hydrogenation catalysts. Typical hydrogenation catalysts can be classified into three types: (1) supported heterogeneous catalysts having compounds of cobalt, nickel, platinum, palladium, or ruthenium deposited on supports such as active carbon, silica and alumina, such catalysts are disclosed in U.S. Pat. Nos. 3,432,481; 3,855,185; 4,078,011; 4,125,569; 4,152,351; 4,152,365; 4,560,817 and 4,629,767; (2) so-called Ziegler type homogeneous catalysts obtained by causing organic acid salts, acetylacetone salts, or alkoxy salts of cobalt, nickel, iron, or chromium to react with a reducing agent such as an organic aluminum compound, such Ziegler type catalysts are disclosed in U.S. Pat. Nos. 3,595,942; 3,634,549; 3,670,054; 3,673,281; 3,696,088; 3,700,633; 3,792,127; and 3,823,203; (3) halides or aryls of cycloolefinyl Group III or IV metal (such as titanium, zirconium and samarium) treated with organolithium reducing agents, such catalysts are disclosed in U.S. Pat. Nos. 4,501,857; 4,673,714; 4,801,666; 4,929,699; 5,039,755; 5,132,372; and 5,173,537.

Among the above-mentioned three types of hydrogenation catalysts, type (3) catalysts demonstrate the highest hydrogenation activity. Thus, hydrogenation will take place with a less amount of type (3) catalyst under lower reaction hydrogen pressure. As mentioned in the prior art, type (3) catalysts can be classified into two kinds. The first kind is the combination of a halide of an unsubstituted or substituted bis(cyclopentadienyl) Group III or IV metal with an organolithium compound. The second kind is the combination of an aryl of an unsubstituted or substituted bis (cyclopentadienyl) Group III or IV metal.

A hydrogenation catalyst of type (3) still has many disadvantages. A notable disadvantage is that once the catalyst solution is prepared by reacting a bis (cyclopentadienyl) Group III or IV metal compound with an organolithium compound in a polar solvent, the prepared catalyst solution is unstable and decomposes quickly even under nitrogen. Therefore, it should be stored in noble gases such as helium, neon and argon, resulting in high investment cost, or it should be immediately used, causing inconvenience.

Another disadvantage of a type (3) hydrogenation catalyst is that only when the catalyst is added to the polymer solution for hydrogenation immediately after the catalyst preparation, will hydrogenation proceed quickly and thoroughly. Therefore, thoroughly mixing the catalyst and the polymer solution is crucial, and controlling the concentration of the catalyst and polymer solution for hydrogenation is difficult.

When halide of a bis(cyclopentadienyl) Group III or IV metal is used, a further disadvantage is that such Group III or IV metal halide, as well as the lithium halide formed from the Group III or IV metal halide and organic lithium compound, will erode pipes of metallic material, therefore, pipes for transport equipment should be made of expensive erosion-resistant metal alloy, thus increasing the investment cost.

When a bis(cyclopentadienyl) titanium compound is used, this compound will react with water to form titanium dioxide during the process of removing the catalyst, thus forming scale on the interior surface of pipes. The formed scale is not easy to remove and is apt to remain in the rubber, thus limiting the application of the rubber.

SUMMARY OF THE INVENTION

Therefore, it is an object of the present invention to solve the above-mentioned problems and to provide a process for selective hydrogenation of a conjugated diene polymer by using a specific hydrogenation catalyst combination including at least one unsubstituted or substituted bis (cyclopentadienyl) Group VIII transition metal compound and at least one organic lithium compound. By using the specific hydrogenation catalyst combination, the oxidation, heat and weather resistance of the polymer are improved, and the efficiency and selectivity of the hydrogenation are both relatively good. No erosion occurs and no scale forms since no halide and titanium contained in the catalyst. Also, the catalyst can be easily removed. Most importantly, the specific hydrogenation catalyst combination has good stability and can be stored in a nitrogen atmosphere.

To achieve the above object, the process for selective hydrogenation of a conjugated diene polymer includes bringing the conjugated diene polymer in an inert organic solvent into contact with hydrogen in the presence of a hydrogenation catalyst combination, including (A) an unsubstituted or substituted bis(cyclopentadienyl) Group VIII transition metal compound and (B) an organic lithium compound, to selectively hydrogenate the unsaturated double bonds in the conjugated diene units of the conjugated diene polymer.

DETAILED DESCRIPTION OF THE INVENTION

The present invention provides a process for selective hydrogenation of a conjugated diene polymer. The term "conjugated diene polymer" as used in the present invention means both a homopolymer and a copolymer of a conjugated diene. Specifically, this term encompasses homopolymers of conjugated dienes, random, block and graft copolymers of two or more conjugated dienes, and random, block and graft copolymers of at least one conjugated diene and at least one vinyl aromatic hydrocarbon.

The conjugated diene polymers to be used in the hydrogenation by the method of the present invention are not particularly differentiated by the molecular weights of such polymers. Generally, however, they are required to have number-average molecular weight of about 1,000 to about 1,000,000, preferably in the range of 10,000 to 500,000.

When the conjugated diene polymer is a block copolymer containing at least one conjugated diene block and at least one vinyl aromatic hydrocarbon block, the vinyl aromatic hydrocarbon polymer block content in the block copolymer is preferably in the range of 10 to 90% by weight based on the total weight of polymers, and the 1,2-vinyl bond content of conjugated diene units in the block copolymer is preferably in the range of 20 to 70% by weight based on the total weight of the conjugated diene units. The suitable block copolymer can be a tapered block copolymer, complete block copolymer or graft copolymer. For the purpose of producing a commercially useful thermoplastic elastomer, block polymers containing at least one conjugated diene polymer block and at least one vinyl aromatic hydrocarbon polymer block are particularly important.

Although the present process can be applied to all hydrocarbon polymers containing unsaturated double bonds, it is preferably applied to conjugated diene polymers. It is the most preferably applicable to conjugated diene living polymers obtained from a living polymerization process using an organic lithium compound as a polymerization catalyst.

The term "conjugated diene living polymer" as used in the present invention has a meaning broad enough to include homopolymers and copolymers of conjugated dienes obtained by using an organic lithium compound as a polymerization catalyst and polymers possessing a lithium atom in the polymer chains thereof and consequently having the ability to grow through polymerization of an additional monomer. In short, a "living" polymer refers to a polymer having a lithium atom on the terminal end of the polymer chain thereof. Specifically, the conjugated diene living polymer embraces living homopolymers of conjugated dienes, random, block and graft living copolymers of two or more conjugated dienes, and random, block and graft living copolymers of at least one conjugated diene and at least one vinyl aromatic hydrocarbon.

The conjugated dienes suitable for the production of the conjugated diene polymers of the present invention are preferably $C_4$–$C_{12}$ conjugated dienes, which include 1,3-butadiene, isoprene, 2,3-dimethyl-1,3-butadiene, 1,3-pentadiene, 2-methyl-1,3-pentadiene, 1,3-hexadiene, 4,5-diethyl-1,3-octadiene and 3-butyl-1,3-octadiene. With a view to producing elastomers excelling in physical properties and permitting industrially advantageous development, 1,3-butadiene and isoprene prove to be particularly desirable conjugated dienes.

The vinyl aromatic hydrocarbons suitable for the production of the conjugated diene polymers of the present invention include styrene, t-butyl styrene, α-methyl styrene, o-methyl styrene, p-methyl styrene, divinyl benzene, 1,1-diphenyl ethylene, vinyl naphthalene, N,N-dimethyl-p-ethyl styrene and N,N-diethyl-p-aminoethylstyrene. Styrene is preferably used due to industrial reasons. Representative examples of such polymers include butadiene/styrene copolymers and isoprene/styrene copolymers since such hydrogenated copolymers have extremely high industrial value. To obtain a thermoplastic elastomer, the vinyl aromatic hydrocarbon content is preferably in the range of 5% to 90% by weight of the total weight of the copolymer.

The conjugated diene polymers suitable for use in the hydrogenation process of the present invention are not particularly differentiated by microstructures of their polymer chains; they may be invariably used advantageously no matter which microstructure their polymer chains may possess. One representative example of the conjugated diene polymer suitable for application to the hydrogenation process of the present invention is a polymer of 1,3-butadiene and/or isoprene. The 1,2-vinyl bond content of conjugated diene units in the conjugated diene polymer is preferably 5% to 70%. A copolymer of 1,3-butadiene and/or isoprene and styrene is another representative example of the conjugated diene polymer suitable for application.

In the above-mentioned block copolymers, a small amount of the vinyl aromatic hydrocarbon may be contained in the conjugated diene block structure, and a small amount of the conjugated diene may be contained in the vinyl aromatic hydrocarbon block structure. Conjugated diene polymers suitable for application to the present hydrogenation process include those polymer described in U.S. Pat. Nos. 3,135,716; 3,150,209; 3,231,635; 3,265,765; 3,322,856; 3,496,154; 3,498,960; 4,145,298 and 4,238,202. In general, linear and branched block copolymers which may be used in the present invention include those which may be represented by the general formula:

wherein

A is a linear or branched polymeric block including predominantly vinyl aromatic hydrocarbon monomer units;

B is a linear or branched polymeric block containing predominantly conjugated diene monomer units;

k and m are, independently, numbers equal to 0 or 1;

l is an integer in the range of 0 to 15, and the sum of k+l+m≧2.

Coupled and radial block copolymers which may be treated in accordance with the present invention include those polymers described in U.S. Pat. Nos. 4,033,888; 4,077,893; 4,141,847; 4,391,949 and 4,444,953, and may be represented by the general formula:

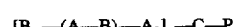

wherein

A, B, k, l and m are as previously defined; n and r are, independently, numbers from 1 to 100 such that n+r≧3;

C is the core of the coupled or radial polymer formed with a polyfunctional coupling agent; and Each P is the same or a different polymer block or polymer block having the general formula:

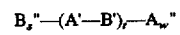

wherein

A" is defined as the same as A, and B" is defined as the same as B;

A'—B' is a polymer block containing vinyl aromatic hydrocarbon monomer units (A') and conjugated diene monomer units (B'), the A'—B' monomer units may be random, tapered or block and when A'—B' is block, the A' block may be the same or different from A", and the B' block may be the same or different from B";

s and w are, independently, numbers equal to 0 or 1, t is an integer from 0 to 15, and the sum of s+t+w≧1.

The radial polymers may be symmetric or asymmetric.

In general, any of the solvents known in the prior art to be useful in the preparation of such conjugated diene polymers may be used. Suitable solvents, then, include straight- and branched-chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as, alkyl-substituted derivatives thereof; aromatic and alkyl-substituted aromatic hydrocarbons such as benzene, naphthalene, toluene, xylene and the like; hydrogenated aromatic hydrocarbons such as tetralin, decalin and the like; halogenated hydrocarbons, particularly halogenated aromatic hydrocarbons, such as chlorobenzene, chlorotoluene and the like; linear and cyclic ethers such as methyl ether, methyl ethyl ether, diethyl ether, tetrahydrofuran and the like.

Conjugated diene polymers to be used in the present invention are produced by any of the methods known to the art, such as, for example, the anionic polymerization method, the cationic polymerization method, the coordinated polymerization method, the radical polymerization method, the solution polymerization method, and the emulsion polymerization method. Among the polymers, living polymers obtained by using an organic lithium compound as a catalyst therefor and containing a lithium atom in the polymer chains thereof are particularly advantageous. As the polymerization catalyst in the manufacture of such a living polymer, hydrocarbon compounds having at least one lithium atom bonded in the molecular units thereof are used. Examples of such hydrocarbon compounds are monolithium compounds such as methyl lithium, ethyl lithium, n-propyl lithium, isopropyl lithium, n-butyl lithium, sec-butyl lithium, tert-butyl lithium, n-pentyl lithium, n-hexyl lithium, phenyl lithium, benzyl lithium and styryl lithium, and dilithium compounds such as 1,4-dilithio-n-butane, 1,5-dilithio-pentane, 1,2-dilithio-diphenyl ethane, 1,4-dilithio-1,1,4,4-tetraphenyl butane, 1,3- or 1,4-bis(1-litho-3-methylpentyl)-benzene. The polymerization catalysts may be lithium oligomers and α,ω-dilithium oligomers which are obtained by such organic lithium compounds. Among the polymerization catalysts, n-butyl lithium and sec-butyl lithium prove particularly popular. These organic lithium compounds may be used either singly or in the form of mixtures consisting of two or more members. Such a polymerization catalyst may be added to the reaction system all at once or separately in two or more divided portions during the course of the polymerization. The amount of such an organic lithium compound may be suitably selected depending on the molecular weight of the polymer desired. Generally, this amount is in the range of 0.005 to 5 mol % based on the total weight of all monomers used.

The selective hydrogenation process of the present invention includes bringing the conjugated diene polymer in an inert organic solvent into contact with hydrogen in the presence of a specific hydrogenation catalyst combination including at least one catalyst (A) and at least one catalyst (B) to selectively hydrogenate the unsaturated double bonds in the conjugated diene units of the conjugated diene polymer.

The catalyst (A) is an unsubstituted or substituted bis (cyclopentadienyl) Group VIII transition metal compound, which is represented by the following formula:

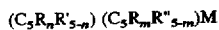

wherein

R, R' and R" are the same or different and are selected from the group consisting of hydrogen, $C_1$–$C_8$ alkyl and alkoxy groups, $C_6$–$C_8$ aryl and aryloxy groups, $C_6$–$C_8$ cycloalkyl and cycloalkoxy groups, $C_1$–$C_5$ hydroxyalkyl groups, aldehyde groups, carboxyl groups, silyl groups, m and n are integers independently from 0 to 5, $C_5R_nR'_{5-n}$ and $C_5R_mR''_{5-m}$ are the same or different unsubstituted or substituted cyclopentadienyl groups, M is a Group VIII transition metal selected from the group consisting of cobalt, nickel, rhodium, palladium, platinum and iridium.

Concrete examples of the hydrogenation catalysts (A) include bis(cyclopentadienyl)cobalt(II), bis(cyclopentadienyl)nickel(II), bis(cyclopentadienyl)palladium, bis(cyclopentadienyl)platinum, bis(pentamethylcyclopentadienyl)cobalt(II), bis(pentamethylcyclopentadienyl)nickel(II), (methylcyclopentadienyl)(cyclopentadienyl)cobalt(II), (methylcyclopentadienyl)(cyclopentadienyl)nickel(II), (carboxycyclopentadienyl)(cyclopentadienyl)cobalt(II) and (carboxycyclopentadienyl)(cyclopentadienyl)nickel(II).

The hydrogenation catalyst (B) is an organic lithium compound having at least one lithium atom or is lithium hydride, which is used for reducing the hydrogenation catalyst (A). Although organic lithium compounds are preferably used, other strong reducing agents such as organic aluminum compounds, organic zinc compounds, and organic magnesium compounds may also be used. When the hydrogenation catalyst (B) is an organic lithium compound having at least one lithium atom, such a compound may contain one lithium atom, represented by R'''Li, or may contain two lithium atoms, represented by R'''Li$_2$. R''' may be a $C_1$ to $C_{30}$ hydrocarbon moiety, more preferably a $C_1$ to $C_{20}$ moiety. Concrete examples of such monolithium compounds include methyl lithium, ethyl lithium, n-propyl lithium, isopropyl lithium, n-butyl lithium, sec-butyl lithium, tert-butyl lithium, n-pentyl lithium, n-hexyl lithium, phenyl lithium, benzyl lithium and styryl lithium. $C_1$ to $C_{20}$ alkyl lithium is preferably used. Concrete examples of dilithium compounds include 1,4-dilithio-n-butane, 1,5-dilithio-pentane, 1,2-dilithio-diphenyl ethane, 1,4-dilithio-1,1,4,4-tetraphenyl butane, 1,3- and 1,4-bis(1-litho-3-methylpentyl)-benzene. Among the various hydrogenation catalysts (B), n-butyl lithium and sec-butyl lithium are more preferably used since they exhibit high hydrogenation activity and selectivity and are also commercially available.

Alternatively, R''' may be a polymeric moiety, specifically speaking, the hydrogenation catalyst (B) may be a conjugated diene living polymer containing a lithium atom in the polymer chain thereof, and such living polymer preferably has a number-average molecular weight of 1,000 to 1,000,000. The conjugated diene living polymer includes a living homopolymer of a conjugated diene, a living copolymer of two or more conjugated dienes, and a living copolymer of at least one conjugated diene and at least one vinyl aromatic hydrocarbon obtained by using an organic lithium compound as a polymerization catalyst.

Representative examples of the conjugated diene living polymer of the present invention is a living polymer of 1,3-butadiene and/or isoprene and a living copolymer of 1,3-butadiene and/or isoprene and styrene. In the case when the catalyst (B) is a living block copolymer of 1,3-butadiene and/or isoprene and styrene, it is preferable that the styrene block content be in the range of 10 to 90% by weight in the total polymer, and the 1,2-vinyl bond content be in the range of 30 to 70% by weight in the 1,3-butadiene and/or isoprene units.

The hydrogenation catalyst (A) is preferably present in an amount of 0.05 to 10 millimoles per 100 g of the conjugated diene polymer. The molar ratio of the catalyst (A) to the catalyst (B) is preferably within the range of 0.5 to 10.

When the hydrogenation by the method of this invention is performed on a living polymer containing a lithium atom in the polymer chain, this hydrogenation is preferably carried out in the presence of the catalyst (A) alone. The amount of the catalyst (A) to be added to the polymer solution is preferably within the range of 0.005 to 10 millimoles per 100 g of the amount of the living polymer. As long as the amount of the added catalyst falls in this range, the hydrogenation can be preferentially effected on the unsaturated double bonds in conjugated diene units of the living polymer without substantially entailing hydrogenation of the aromatic nucleus double bonds. Even if the catalyst (A) is added in an amount exceeding 10 millimoles, the living polymer may be hydrogenated. When the catalyst (A) is added in excess of 10 millimoles, the excess catalyst does not increase the hydrogenation effect, rather, it increases the work necessary to remove the residual catalyst from the hydrogenation product, thus adversely affecting costs. When the catalyst (A) is added in an amount not exceeding 0.005 millimole, it tends to be inactivated by the foreign matter and does not enable the hydrogenation to proceed smoothly. Preferably, the amount of the catalyst (A) added to the polymer solution is in the range of 0.02 to 8 millimoles per 100 g of the living polymer.

The molar ratio of lithium atom of the catalyst (B) to M atom (M is cobalt, nickel, rhodium, palladium, platinum and iridium) of the catalyst (A) (hereinafter referred to as Li/M) is preferably in the range of 0.1 to 100, more preferably in the range of 0.5 to 20. When the Li/M is less than 0.5, the hydrogenation combination exhibit less hydrogenation efficiency. When the Li/M is larger than 20, the hydrogenation efficiency is not further improved, and the excess expensive catalyst (B) not only results in an unnecessarily high cost, but also leads to the formation of gels and undesirable secondary reactions. A Li/M within the range of 2 to 6 proves most desirable.

When the hydrogenation by the method of this invention is performed on a polymer other than a living polymer containing a lithium atom in the polymer chain, it is essential to use at least one catalyst (A) and at least one catalyst (B) in combination. The amount of the catalyst (A) to be added to the polymer solution is preferably within the range of 0.005 to 20 millimoles per 100 g of the amount of the inactivated polymer. As long as the amount of the added catalyst falls in this range, the hydrogenation can be preferentially effected on the unsaturated double bonds in conjugated diene units of the living polymer without substantially entailing hydrogenation of the aromatic nucleus double bonds.

According to the present invention, the hydrogenation contemplated by this invention is desirably carried out in a solution of a given polymer in an inert organic solvent and is more desirably carried out by using a polymer solution obtained by polymerizing a conjugated diene, for example, in an inert solvent to be continuously utilized in the subsequent reaction of hydrogenation. The term "inert organic solvent" means a solvent which does not react with any of the substances participating in the reactions of polymerization and hydrogenation. Examples of desirable solvents are aliphatic hydrocarbons such as n-pentane, n-hexane, n-heptane, and n-octane, alicyclic hydrocarbons such as cyclohexane and cycloheptane, and ethers such as diethyl ether and tetrahydrofuran. Such aromatic hydrocarbons as benzene, toluene, xylene, and ethyl benzene are usable only when the aromatic double bonds are not hydrogenated under selected conditions of hydrogenation. These above-mentioned solvents may be used either alone or in the form of mixtures.

The hydrogenation of the present invention is carried out on a given polymer in a concentration of 1 to 50% by weight, preferably 3 to 30% by weight, based on the amount of the solvent to be used. When the hydrogenation is carried out on a living polymer, it is essential that the living polymer subjected to the hydrogenation should retain lithium intact and should not be totally inactivated by water or some other foreign matters present in the solvent.

The aforementioned catalysts, (A) and (B), may be directly added to the polymer solution. Otherwise, they may be added by being preparatorily dissolved in such inert organic solvents as enumerated above. The addition in the form of solutions is more advantageous for the purpose of enabling the hydrogenation to proceed uniformly and quickly.

Where the hydrogenation is carried out by using both the catalyst, (A) and (B), the two catalysts (A) and (B) may be mixed and, in the mixed form, reduced and added to the polymer solution. They may be separately added to the polymer solution, one after the other. Otherwise, they may be simultaneously added to the polymer solution. When necessary, these catalysts, (A) and (B), may be additionally incorporated into the reaction system during the course of hydrogenation. For the purpose of causing the hydrogenation to proceed quickly, it is desirable that the catalysts, (A) and (B), should be mixed in a prescribed ratio and, in the mixed state, reduced and then added to the polymer solution.

Conventionally, when a conjugated diene polymer is hydrogenated using a cyclopentadienyl Group III or IV metal compound as a hydrogenation catalyst, such catalyst should be handled under an inert atmosphere. The term "inert atmosphere" means an atmosphere of helium, neon, or argon, for example, which does not react with any of the substances participating in the reaction of hydrogenation. Air and oxygen are poor choices because they oxidize or decompose the hydrogenation catalyst and entail inactivation of the catalyst. It should be noted that nitrogen is also a poor choice for the conventional cyclopentadienyl Group III or IV metal compound. However, the catalyst combination of the present invention, including a bis(cyclopentadienyl) Group VIII transition metal compound and an organic lithium compound, can still be handled under nitrogen, and no expensive inert atmosphere is needed, thus greatly reducing the cost, which is an advantage over the conventionally used catalyst. In addition, the addition of the conventional cyclopentadienyl Group III or IV metal compound to the polymer solution should be conducted in a hydrogen gas atmosphere. Advantageously, the hydrogen can be fed in after the specific catalyst combination of the present invention is thoroughly mixed with the polymer solution.

The purpose of the selective hydrogenation of the present invention is to hydrogenate as many of the unsaturated double bonds in the conjugated diene units as possible and to hydrogenate as few as possible of the unsaturated double bonds in the vinyl aromatic hydrocarbon units (aromatic nucleus portion) of the polymer. By using the specific hydrogenation catalyst combination including an unsubstituted or substituted bis(cyclopentadienyl) Group VIII transition metal compound (catalyst (A)) and a organic lithium compound (catalyst (B)), the hydrogenation conversion and selectivity of the conjugated diene units is high. At least 50%, possibly up to 90% of the unsaturated double bonds in the conjugated diene units can be selectively hydrogenated, and not more than 10%, perhaps not more than 5% of the unsaturated double bonds in the vinyl aromatic hydrocarbon units are hydrogenated.

Generally, the hydrogenation is carried out at temperatures between −20° and 150° C., preferably in the range of 20° to 100° C. Although the pressure of the hydrogen to be used for the hydrogenation of the polymer is not specifically defined, it is preferably in the range of 1 to 100 kg/cm$^2$, more preferably in the range of 2 to 50 kg/cm$^2$. The duration of the hydrogenation effected by this invention generally falls in the range of several seconds to 50 hours. The hydrogenation of the present invention can be carried out by any of the known methods, such as the batch method and the continuous method. The progress of the hydrogenation can be comprehended throughout the whole course of hydrogenation by monitoring the amount of hydrogen absorbed by the polymer solution.

The vinyl aromatic hydrocarbon polymer block content is determined by the method reported in Kolthoff, L. M., et al., *J. Polymer Sci.*, Vol. 1, p.429 (1946). The 1,2-vinyl bond content of conjugated diene units in the conjugate diene polymer is determined by the Hampton method [Hampton, R. R., *Anal. Chem.*, Vol. 29, p.923(1949)] using an infrared ray absorption spectrum, calculating the proportion of the 1,2-vinyl bonds to the conjugated diene units, and reporting this proportion in terms of weight ratio. The hydrogenation conversion of conjugated diene units can be determined by the infrared ray absorption spectrum, and the hydrogenation conversion of the aromatic nucleus portion can be determined by the ultraviolet ray absorption spectrum, which are described in U.S. Pat. No. 4,501,857.

In conclusion, the selective hydrogenation process of the present invention has the following advantages:

(1) The present invention enables the conjugated diene polymer to be hydrogenated in the presence of a small amount of a highly active catalyst under mild conditions.

(2) The present invention permits a large amount of the unsaturated double bonds in conjugated diene units of the polymer to be selectively hydrogenated, while only a extremely small amount of the unsaturated double bonds in vinyl aromatic hydrocarbon units (aromatic nucleus portion) of the polymer are hydrogenated.

(3) The present invention can also be applied to a conjugated diene living polymer having a lithium atom in the polymer chain. In such a case, since the conjugated diene living polymer has an active lithium atom, which can effectively reduce the catalyst (A), therefore, the hydrogenation will take place only in the presence of the catalyst (A) alone, no additional catalyst (B) need be added, thus reducing the cost. Actually, the conjugated diene living polymer itself functions as a catalyst (B).

(4) The specific hydrogenation catalyst combination can be stored under nitrogen, and it is not necessary to use an expensive inert gas such as helium and argon, thus reducing the cost.

The hydrogenated polymers which are obtained by the method of this invention are used as elastomers, thermoplastic elastomers, or thermoplastic resins which excel in resistance to weather conditions and to oxidation. By incorporation of various additives such as ultraviolet ray absorbents, oils, and fillers or by mixture with other elastomers and resins, the hydrogenated polymers find extensive utility in various applications of commercial importance.

The following examples are intended to demonstrate this invention more fully without limiting its scope, since numerous modifications and variations will be apparent to those skilled in the art.

COMPARATIVE EXAMPLE 1

10 g of Taipol-416 (bound styrene content=29.5%, bound butadiene content=70.5%, number-average molecular weight determined by gel permeation chromatography (GPC)=16.5×10$^4$, 1,2-vinyl bond content=10.5%) was dissolved with cyclohexane/tetrahydrofuran (THF) (100:15, v/v) under dried nitrogen to a polymer solution of 5 wt %. The polymer solution was placed in an autoclave having an inner volume of 600 ml, Raney nickel (nickel atom/polymer=10.8 (w/w)) was added as a catalyst for hydrogenation and dried hydrogen was fed in under a pressure of 600 psig. The contents of the autoclave were heated to 140° C. for 24 hours. No hydrogenation occurred.

COMPARATIVE EXAMPLE 2

10 g of Taipol-411 (bound styrene content=29.5%, bound butadiene content=70.5%, number-average molecular weight determined by GPC=25×10$^4$, 1,2-vinyl bond content=9.0%) was dissolved with cyclohexane/THF (100:15, v/v) under dried nitrogen to obtain a polymer solution of 5 wt %. The polymer solution was placed in an autoclave having an inner volume of 600 ml., acetylacetone cobalt(III) and triethyl aluminum (the molar ratio of Al/Co=5) were added as catalysts for hydrogenation (the polymer/Co=85:1(w/w)) and dried hydrogen was fed in under a pressure of 250 psig. The contents in the autoclave were heated to 27° C. for 4 hours. The hydrogenation conversion of conjugated diene units determined by hydrogen consumption was 98%, and the hydrogenation conversion of styrene units was as high as 13.3%. Such a hydrogenation selectivity was not acceptable.

COMPARATIVE EXAMPLE 3

10 g of Taipol-416 (bound styrene content=29.5%, bound butadiene content=70.5%, number-average molecular weight determined by gel permeation chromatography (GPC)=16.5×10$^4$, 1,2-vinyl bond content=10.5%) was dissolved with cyclohexane/THF (100:15, v/v) under dried nitrogen to obtain a polymer solution of 5 wt %. The polymer solution was placed in an autoclave having an inner volume of 600 ml, acetylacetone nickel(II) and n-butyl lithium (the molar ratio of Li/Ni=4) were added as catalysts for hydrogenation (the polymer/Ni=170:1 (w/w)) and dried hydrogen was fed in under a pressure of 250 psig. The contents in the autoclave were heated to 27° C. for 4 hours. The hydrogenation conversion of conjugated diene units determined by hydrogen consumption was 32%, and the hydrogenation conversion of styrene units was less than 1%. The hydrogenation efficiency was not acceptable.

REFERENTIAL EXAMPLE 1

In an autoclave having an inner volume of 5 liters, 2700 g of cyclohexane, 90 g of styrene, 0.69 g of n-butyl lithium and adequate amount of tetrahydrofuran (THF) (the molar ratio of THF/n-butyl lithium is 40) were placed and then stirred and heated to 60° C. for 3 hours to induce polymerization. Subsequently, 210 g of 1,3-butadiene was added to the resultant reaction solution and again heated to 60° C. for 2 hours to continue polymerization. 0.9 g of phenyl bezoate was added to the resultant styrene-butadiene living block copolymer solution to effect coupling. Consequently, there was obtained a copolymer having a bound styrene content of 29.5%, a 1,2-vinyl bond content of 43% and a number-average molecular weight of about $9.8 \times 10^4$.

REFERENTIAL EXAMPLE 2

In an autoclave having an inner volume of 5 liters, 2600 g of cyclohexane, 45 g of styrene, 0.35 g of n-butyl lithium and adequate amount of tetrahydrofuran (THF) (the molar ratio of THF/n-butyl lithium is 30) were placed and then stirred and heated to 60° C. for 2 hours to induce polymerization. Subsequently, 220 g of 1,3-butadiene was added to the resultant reaction solution and again heated to 60° C. for 2 hours to continue polymerization. 45 g of styrene was further added and then heated to 60° C. for 1 hour to induce the third step polymerization. Finally, methanol was added in an amount of 4 times the number of moles of butyl lithium to induce inactivation. Consequently, there was obtained a copolymer having a bound styrene content of 29.0%, a 1,2-vinyl bond content of 35% and a number-average molecular weight of about $9.0 \times 10^4$.

COMPARATIVE EXAMPLE 4

800 g of the polymer solution obtained from Referential Example 1 was diluted with cyclohexane to obtain a polymer solution of 8% by weight. Nickel octoate solution was distilled to reduce the water content to a level lower than 100 ppm. The dried nickel octoate and triisobutyl aluminum (molar ratio=1:6) were mixed under adiabatic conditions to produce a black catalyst solution. After being prepared, the catalyst solution was immediately added to an autoclave (having an inner volume of 2 liters) containing the polymer solution (nickel octoate/polymer=1:100(w/w)) and the hydrogenation was carried out under a hydrogen pressure of 20 kg/cm² at 80° C. for various reaction times. The reaction times and results are shown in Table 1.

TABLE 1

| Reaction time (min) | 30 | 60 | 90 | 120 | 150 | 180 |
|---|---|---|---|---|---|---|
| Residual trans double bond (%) | 75.8 | 54.1 | 42.0 | 27.3 | 10.0 | 5.2 |
| Residual 1,2-vinyl bond (%) | 30.5 | 15.2 | 4.3 | 0 | 0 | 0 |
| Hydrogenation conversion of butadiene units (%) | 39.0 | 62.1 | 74.2 | 84.3 | 94.0 | 96.8 |
| Hydrogenation conversion of styrene units (%) | — | — | — | — | — | 1.9 |

COMPARATIVE EXAMPLE 5

800 g of the polymer solution obtained from Referential Example 2 was diluted with cyclohexane to obtain a polymer solution of 7.3 wt %. In a glove box, 0.249 g of bis(cyclopentadienyl)titanium dichloride was dissolved with 100 ml of cyclohexane to which 1.1 ml of n-butyl lithium was added and subject to constant stirring for about 5 hours to give a hydrogenation catalyst solution. 330 g of the diluted polymer solution was charged into an autoclave having an inner volume of 1 liter and heated to 80° C. Then, the autoclave was purged with nitrogen and 24 ml of the prepared hydrogenation catalyst solution was added. With quick and thorough stirring, 2 ml of triethyl aluminum was added to remove impurities in the solution. Finally, hydrogen was fed in under a pressure of 25 kg/cm² and the contents of the autoclave were maintained at 80° C. and hydrogenated for various period of time under constant stirring. The reaction times and results are shown in Table 2.

TABLE 2

| Reaction time (min) | 60 | 120 | 180 | 240 | 300 |
|---|---|---|---|---|---|
| Residual trans double bond (%) | 28.7 | 14.9 | 10.0 | 7.1 | 2.1 |
| Residual 1,2-vinyl bond (%) | 21.5 | 7.9 | 6.3 | 4.8 | 0.9 |
| Hydrogenation conversion of butadiene units (%) | 75.6 | 87.9 | 91.5 | 93.9 | 98.4 |
| Hydrogenation conversion of styrene units (%) | <1 | <1 | <1 | <1 | <1 |

EXAMPLE 1

In a glove box, 0.189 g of bis(cyclopentadienyl)cobalt(II) was dissolved in 100 ml of cyclohexane to which 1.1 ml of n-butyl lithium was added as a reducing agent at a constant and thorough stirring for more than 5 hours to give a hydrogenation catalyst solution. The copolymer solution obtained in Referential Example 2 was diluted with cyclohexane to a polymer concentration of 7.3% by weight. 330 g of the diluted polymer solution was charged into an autoclave having an inner volume of 1 liter. Nitrogen was purged to remove gaseous impurities in the autoclave, then, 24 ml of the prepared hydrogenation catalyst solution was immediately added. Finally, hydrogen was fed in under a pressure of 25 kg/cm² to undergo hydrogenation at 80° C. The hydrogenation times and results are shown in Table 3.

TABLE 3

| Reaction time (min) | 60 | 120 | 180 | 240 | 300 |
|---|---|---|---|---|---|
| Residual trans double bond (%) | 7.2 | 2.2 | 0 | 0 | 0 |
| Residual 1,2-vinyl bond (%) | 0.2 | 0 | 0 | 0 | 0 |
| Hydrogenation conversion of butadiene units (%) | 95.7 | 99.2 | 100 | 100 | 100 |
| Hydrogenation conversion of styrene units (%) | <1 | <1 | <1 | <1 | <1 |

EXAMPLE 2

The same procedures as described in Example 1 were employed, except that 0.189 g of bis(cyclopentadienyl)cobalt(II) was replaced by 0.192 g of bis(cyclopentadienyl)nickel(II). The hydrogenation times and results are shown in Table 4.

TABLE 4

| Reaction time (min) | 60 | 120 | 180 | 240 | 300 |
|---|---|---|---|---|---|
| Residual trans double bond (%) | 43.2 | 32.3 | 23.2 | 11.6 | 9.4 |
| Residual 1,2-vinyl bond (%) | 21.6 | 8.7 | 0.1 | 0 | 0 |
| Hydrogenation conversion of butadiene units (%) | 66.0 | 83.7 | 86.2 | 93.2 | 95.0 |
| Hydrogenation conversion of styrene units (%) | <1 | <1 | <1 | <1 | <1 |

EXAMPLE 3

The same procedures as described in Example 1 were employed, except that the prepared hydrogenation catalyst was stored in the glove box for two weeks before being used for hydrogenation of the polymer solution obtained from Referential Example 2. When the prepared hydrogenation catalyst solution was stored for two weeks, the homogeneous solution turned into a suspension, that is, partly suspended and partly precipitated. However, such a hydrogenation catalyst suspension still maintained good dispersion under vigorous stirring. The hydrogenation was carried out according to the same procedures of Example 1 and the reaction time was 300 minutes. The results are as follows. The residual 1,2-vinyl double bond was 0%, the residual trans double bond was 1.2%, the hydrogenation conversion of butadiene units was 99.0%, and the hydrogenation conversion of styrene units was less than 1%. This proves that although the hydrogenation catalyst solution was stored under nitrogen for two weeks before its use, the catalyst solution still functions well.

EXAMPLE 4

The same procedures as described in Example 1 were employed, except that 1.1 ml of n-butyl lithium was replaced by 1.4 ml of phenyl lithium. The hydrogenation times and results are shown in Table 5.

TABLE 5

| Reaction time (min) | 60 | 120 | 180 | 240 | 300 |
|---|---|---|---|---|---|
| Residual trans double bond (%) | 34.0 | 18.0 | 9.0 | 4.5 | 1.6 |
| Residual 1,2-vinyl bond (%) | 32.5 | 13.0 | 6.3 | 3.2 | 0 |
| Hydrogenation conversion of butadiene units (%) | 66.6 | 84.0 | 92.1 | 96.0 | 99.0 |
| Hydrogenation conversion of styrene units (%) | <1 | <1 | <1 | <1 | <1 |

EXAMPLE 5

The same procedures as described in Example 1 were employed, except that the addition amount of n-butyl lithium is increased from 1.1 ml to 2.2 ml, and hydrogen was fed in under a pressure of 25 kg/cm² to undergo hydrogenation at 80° C. for 5 hours. The results are as follows. The residual trans double bond was 7.8% the residual 1,2-vinyl double bond was 0.5% the hydrogenation conversion of butadiene units was 95.1%, and the hydrogenation conversion of styrene units was less than 1%.

What is claimed is:

1. A process for selective hydrogenation of a conjugated diene polymer, the conjugated diene polymer being a homopolymer of a conjugated diene, a copolymer of two or more conjugated dienes or a copolymer of at least one conjugated diene and at least one vinyl aromatic hydrocarbon, said process comprising bringing the conjugated diene polymer in an inert organic solvent into contact with hydrogen in the presence of a hydrogenation catalyst combination to selectively hydrogenate the unsaturated double bonds in the conjugated diene units of the conjugated diene polymer, wherein the hydrogenation catalyst combination includes at least one catalyst (A) and at least one catalyst (B), wherein the catalyst (A) is an unsubstituted or substituted bis(cyclopentadienyl) Group VIII transition metal compound, which is represented by the following formula:

wherein

R, R' and R" are the same or different and are selected from the group consisting of hydrogen, $C_1$–$C_8$ alkyl and alkoxy groups, $C_6$–$C_8$ aryl and aryloxy groups, $C_6$–$C_8$ cycloalkyl and cycloalkoxy groups, $C_1$–$C_5$ hydroxyalkyl groups, aldehyde groups, carboxyl groups, silyl groups, m and n are integers independently from 0 to 5, $C_5R_nR'_{5-n}$ and $C_5R_mR''_{5-m}$ are the same or different unsubstituted or substituted cyclopentadienyl groups, M is a Group VIII transition metal selected from the group consisting of cobalt, nickel, rhodium, palladium, platinum and iridium, wherein the catalyst (B) is an organic lithium compound having at least one lithium atom or is lithium hydride, wherein the organic lithium compound is selected from the group consisting of R'''Li and R'''Li$_2$, wherein R''' is a $C_1$–$C_{30}$ hydrocarbon moiety or a polymeric moiety, wherein the molar ratio of lithium atom to M atom is from 0.1 to 100.

2. The process as claimed in claim 1, wherein the conjugated diene is selected from the group consisting of 1,3-butadiene, isoprene, 2,3-dimethyl-1,3-butadiene, 1,3-pentadiene, 2-methyl-1,3-pentadiene, 1,3-hexadiene, 4,5-diethyl-1,3-octadiene and 3-butyl-1,3-octadiene.

3. The process as claimed in claim 1, wherein the vinyl aromatic hydrocarbon is selected from the group consisting of styrene, t-butyl styrene, α-methyl styrene, o-methyl styrene, p-methyl styrene, divinyl benzene, 1,1-diphenyl ethylene, vinyl naphthalene, N,N-dimethyl-p-ethyl styrene and N,N-diethyl-p-aminoethylstyrene.

4. The process as claimed in claim 1, wherein the conjugated diene polymer is a homopolymer of a conjugated diene or a copolymer of two or more conjugated dienes.

5. The process as claimed in claim 4, wherein the conjugated diene polymer is a polymer of 1,3-butadiene and/or isoprene.

6. The process as claimed in claim 5, wherein the 1,2-vinyl bond content of conjugated diene units in the conjugated diene polymer is 5% to 70%.

7. The process as claimed in claim 1, wherein the conjugated diene polymer is a copolymer of at least one conjugated diene and at least one vinyl aromatic hydrocarbon.

8. The process as claimed in claim 7, wherein the conjugated diene polymer is a copolymer of 1,3-butadiene and/or isoprene and styrene.

9. The process as claimed in claim 7, wherein the conjugated diene polymer is a copolymer of 1,3-butadiene and styrene.

10. The process as claimed in claim 7, wherein the conjugated diene polymer is a block copolymer having at least one conjugated diene polymer block and at least one vinyl aromatic hydrocarbon polymer block.

11. The process as claimed in claim 10, wherein the vinyl aromatic hydrocarbon polymer block content in the block copolymer is 10 to 90% by weight based on the total weight of polymers.

12. The process as claimed in claim 10, wherein the 1,2-vinyl bond content of conjugated diene units in the block copolymer is 20 to 70% by weight based on the total weight of the conjugated diene units.

13. The process as claimed in claim 1, wherein the number-average molecular weight of the conjugated diene polymer is about 1,000 to about 1,000,000.

14. The process as claimed in claim 1, wherein the hydrogenation catalyst (A) is selected from the group consisting of bis(cyclopentadienyl)cobalt(II), bis (cyclopentadienyl)nickel(II), bis(cyclopentadienyl) palladium, bis(cyclopentadienyl)platinum, bis (pentamethylcyclopentadienyl)cobalt(II), bis (pentamethylcyclopentadienyl)nickel(II), (methylcyclopentadienyl)(cyclopentadienyl)cobalt(II), (methylcyclopentadienyl)(cyclopentadienyl)nickel(II), (carboxycyclopentadienyl)(cyclopentadienyl)cobalt(II) and (carboxycyclopentadienyl)(cyclopentadienyl)nickel(II).

15. The process as claimed in claim 14, wherein the hydrogenation catalyst (A) is selected from the group consisting of bis(cyclopentadienyl)cobalt(II) and bis (cyclopentadienyl)nickel(II).

16. The process as claimed in claim 1, wherein the hydrogenation catalyst (B) is R'''Li, wherein R''' is a $C_1$–$C_{20}$ hydrocarbon moiety.

17. The process as claimed in claim 16, wherein the hydrogenation catalyst (B) is selected from the group consisting of methyl lithium, ethyl lithium, n-propyl lithium, isopropyl lithium, n-butyl lithium, sec-butyl lithium, tert-butyl lithium, n-pentyl lithium, n-hexyl lithium, phenyl lithium, benzyl lithium and styryl lithium.

18. The process as claimed in claim 16, wherein R''' is a $C_1$–$C_{20}$ alkyl group.

19. The process as claimed in claim 18, wherein the hydrogenation catalyst (B) is selected from the group consisting of n-butyl lithium and sec-butyl lithium.

20. The process as claimed in claim 1, wherein the hydrogenation catalyst (A) is present in an amount of 0.05 to 10 millimoles per 100 g of the conjugated diene polymer.

21. The process as claimed in claim 1, wherein in the hydrogenation catalyst combination, the molar ratio of the catalyst (A) to the catalyst (B) is 0.5 to 10.

22. The process as claimed in claim 1, wherein the hydrogenation is carried out at 20° to 100° C., under a hydrogen pressure of 2 to 50 kg/cm$^2$.

23. The process as claimed in claim 1, wherein at least 50% of the unsaturated double bonds in the conjugated diene units are hydrogenated.

24. The process as claimed in claim 23, wherein at least 90% of the unsaturated double bonds in the conjugated diene units are hydrogenated.

25. The process as claimed in claim 7, wherein at least 50% of the unsaturated double bonds in the conjugated diene units are selectively hydrogenated, and not more than 10% of the unsaturated double bonds in the vinyl aromatic hydrocarbon units are hydrogenated.

26. The process as claimed in claim 25, wherein at least 90% of the unsaturated double bonds in the conjugated diene units are selectively hydrogenated, and not more than 5% of the unsaturated double bonds in the vinyl aromatic hydrocarbon units are hydrogenated.

27. The process as claimed in claim 11, wherein in the block copolymer, the 1,2-vinyl bonds content is 30 to 70% by weight of the total conjugated diene units.

28. The process as claimed in claim 10, wherein at least 50% of the unsaturated double bonds in the conjugated diene units are selectively hydrogenated, and not more than 10% of the unsaturated double bonds in the vinyl aromatic hydrocarbon units are hydrogenated.

29. The process as claimed in claim 11, wherein at least 50% of the unsaturated double bonds in the conjugated diene units are selectively hydrogenated, and not more than 10% of the unsaturated double bonds in the vinyl aromatic hydrocarbon units are hydrogenated.

30. The process as claimed in claim 12, wherein at least 50% of the unsaturated double bonds in the conjugated diene units are selectively hydrogenated, and not more than 10% of the unsaturated double bonds in the vinyl aromatic hydrocarbon units are hydrogenated.

31. The process as claimed in claim 13, wherein at least 50% of the unsaturated double bonds in the conjugated diene units are selectively hydrogenated, and not more than 10% of the unsaturated double bonds in the vinyl aromatic hydrocarbon units are hydrogenated.

32. The process as claimed in claim 1, wherein the hydrogenation catalyst (B) is represented by the formula R'''Li, wherein R''' is a polymeric moiety.

33. The process as claimed in claim 32, wherein the hydrogenation catalyst (B) is a conjugated diene living polymer containing a lithium atom in the polymer chain thereof and having a number-average molecular weight in the range of from 1,000 to 1,000,000, the conjugated diene living polymer being a living homopolymer of a conjugated diene, a living copolymer of two or more conjugated dienes or a living copolymer of at least one conjugated diene and at least one vinyl aromatic hydrocarbon obtained by using an organic lithium compound as a polymerization catalyst.

34. The process as claimed in claim 33, wherein the hydrogenation catalyst (A) is bis(cyclopentadienyl)cobalt (II) or bis(cyclopentadienyl)nickel(II).

35. The process as claimed in claim 34, wherein the hydrogenation catalyst (A) is present in a amount of 0.005 to 10 millimoles per 100 g of the conjugated diene polymer.

36. The process as claimed in claim 33, wherein the conjugated diene living polymer is a living polymer of 1,3-butadiene and/or isoprene.

37. The process as claimed in claim 33, wherein the conjugated diene living polymer is a living copolymer of 1,3-butadiene and/or isoprene and styrene.

38. The process as claimed in claim 33, wherein the conjugated diene living polymer is a living copolymer of 1,3-butadiene and styrene.

39. The process as claimed in claim 37, wherein the conjugated diene living copolymer has at least one 1,3-butadiene and/or isoprene block and at least one styrene block in which the styrene block content is in the range of 10 to 90% by weight of the total weight of the polymer, and the 1,2-vinyl bond content is in the range of 30 to 70% by weight in the 1,3-butadiene and/or isoprene units.

40. The process as claimed in claim 39, wherein at least 90% of the unsaturated double bonds in the 1,3-butadiene and/or isoprene units are selectively hydrogenated, and not more than 5% of the unsaturated double bonds in the styrene units are hydrogenated.

41. A process for selective hydrogenation of a conjugated diene polymer, the conjugated diene polymer being a homopolymer of a conjugated diene, a copolymer of two or more conjugated dienes or a copolymer of at least one conjugated diene and at least one vinyl aromatic hydrocarbon, said process comprising bringing the conjugated diene polymer in an inert organic solvent into contact with hydrogen in the presence of a hydrogenation catalyst combination to selectively hydrogenate the unsaturated double bonds in the conjugated diene units of the conjugated diene polymer, wherein the hydrogenation catalyst combination includes at least one catalyst (A) and at least one catalyst (B), wherein the catalyst (A) is an unsubstituted or substituted bis(cyclopentadienyl) Group VIII transition metal compound, which is represented by the following formula:

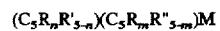

wherein
R, R' and R" are the same or different, and are selected from the group consisting of hydrogen, $C_1-C_8$ alkyl and alkoxy groups, $C_6-C_8$ aryl and aryloxy groups, $C_6-C_8$ cycloalkyl and cycloalkoxy groups, $C_1-C_5$ hydroxyalkyl groups, aldehyde groups, carboxyl groups, silyl groups, m and n are integers independently from 0 to 5, $C_5R_nR'_{5-n}$ and $C_5R_mR''_{5-m}$ are the same or different unsubstituted or substituted cyclopentadienyl groups, M is a Group VIII transition metal selected from the group consisting of cobalt and nickel, wherein the catalyst (B) is an organic lithium compound having at least one lithium atom or is lithium hydride, wherein the organic lithium compound is selected from the group consisting of R'''Li and R'''Li$_2$, wherein R''' is a $C_1-C_{30}$ hydrocarbon moiety or a polymeric moiety, wherein the molar ratio of lithium atom to M atom is from 0.1 to 100.

42. A process for selective hydrogenation of a conjugated diene polymer, the conjugated diene polymer being a homopolymer of a conjugated diene, a copolymer of two or more conjugated dienes or a copolymer of at least one conjugated diene and at least one vinyl aromatic hydrocarbon, said process comprising bringing the conjugated diene polymer in an inert organic solvent into contact with hydrogen in the presence of a hydrogenation catalyst combination to selectively hydrogenate the unsaturated double bonds in the conjugated diene units of the conjugated diene polymer, wherein the hydrogenation catalyst combination includes at least one catalyst (A) and at least one catalyst (B), wherein the catalyst (A) is selected from the group consisting of bis(cyclopentadienyl)cobalt(II) and bis(cyclopentadienyl)nickel(II), wherein the catalyst (B) is an organic lithium compound R''' Li, wherein R''' is a $C_1-C_{20}$ hydrocarbon moiety, wherein the molar ratio of lithium atom to M atom is from 0.1 to 100.

* * * * *